A. L. POST.
MACHINE FOR MOLDING BUILDING BLOCKS.
APPLICATION FILED OCT. 11, 1907.

931,644.

Patented Aug. 17, 1909.
5 SHEETS—SHEET 1.

Witnesses.
E. B. Gilchrist
J. W. Barber

Inventor.
Alvah L. Post.
By E. N. Barber,
his Atty.

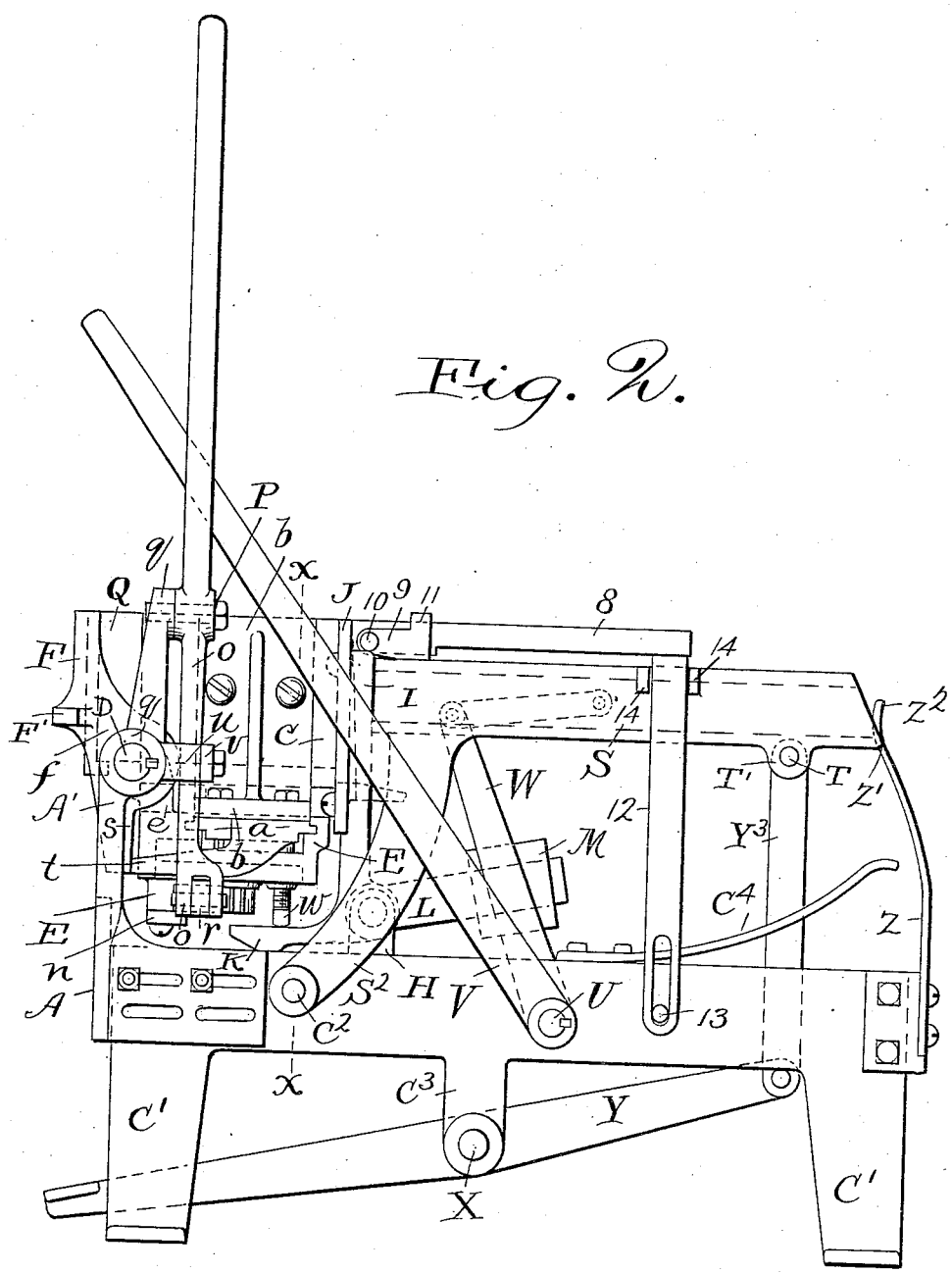

A. L. POST.
MACHINE FOR MOLDING BUILDING BLOCKS.
APPLICATION FILED OCT. 11, 1907.

931,644.

Patented Aug. 17, 1909.
5 SHEETS—SHEET 3.

Witnesses,
E. B. Gilchrist
J. N. Barber

Inventor,
Alvah L. Post
By E. N. Barber,
his Atty.

A. L. POST.
MACHINE FOR MOLDING BUILDING BLOCKS.
APPLICATION FILED OCT. 11, 1907.
931,644.
Patented Aug. 17, 1909.
5 SHEETS—SHEET 4.
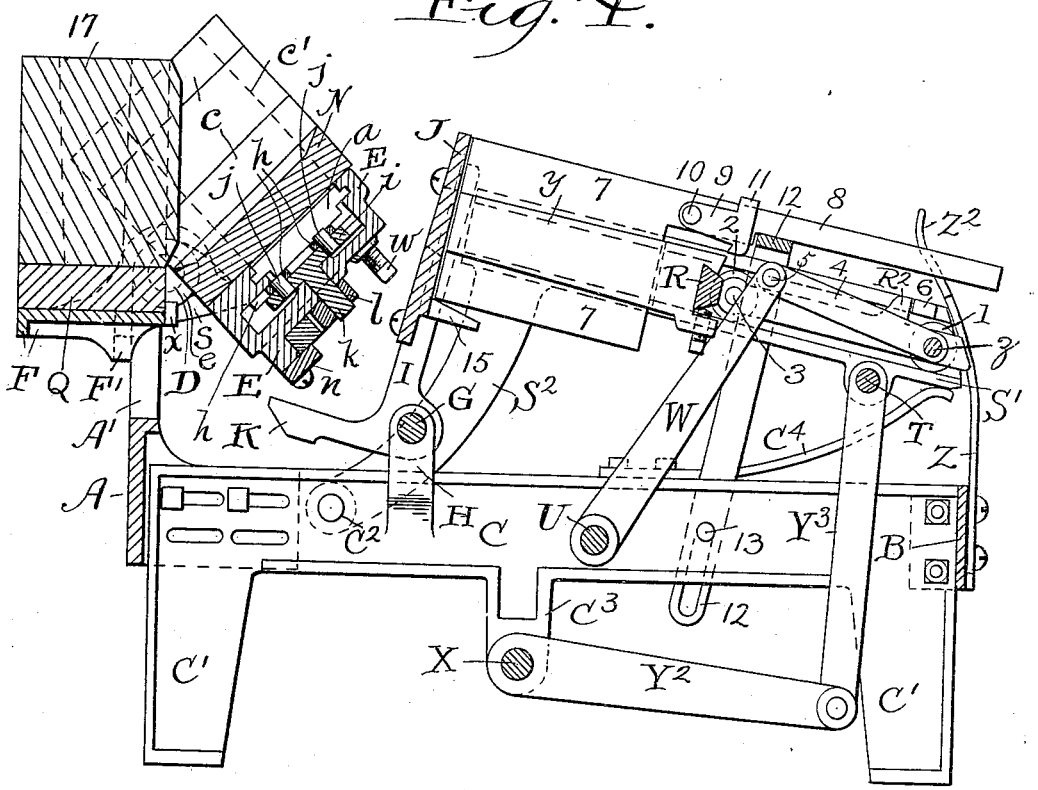

A. L. POST.
MACHINE FOR MOLDING BUILDING BLOCKS.
APPLICATION FILED OCT. 11, 1907.

931,644.

Patented Aug. 17, 1909.
5 SHEETS—SHEET 5.

Witnesses.
E. B. Gilchrist
J. N. Barber

Inventor
Alvah L. Post
By E. N. Barber,
his Atty.

UNITED STATES PATENT OFFICE.

ALVAH L. POST, OF KENT, OHIO, ASSIGNOR TO THE KENT MACHINE COMPANY, OF KENT, OHIO, A CORPORATION OF OHIO.

MACHINE FOR MOLDING BUILDING-BLOCKS.

No. 931,644.   Specification of Letters Patent.   Patented Aug. 17, 1909.

Application filed October 11, 1907. Serial No. 396,918.

*To all whom it may concern:*

Be it known that I, ALVAH L. POST, a citizen of the United States of America, and a resident of the village of Kent, in the county of Portage and State of Ohio, have invented certain new and useful Improvements in Machines for Molding Building-Blocks, of which the following is a specification.

My invention relates to improvements in machines, for molding hollow building blocks, of the type known as "face down" machines.

The objects of my improvements are, to so construct a machine of this type that it may be operated very rapidly, and to bring the cores into place in the mold in such a way that the filling of the lower part of the mold somewhat unevenly and somewhat above to where the under sides of the cores are to come, does not interfere with bringing the cores easily and quickly to their proper positions in the mold and in such a way that they are pressed downwardly into the material in the bottom of the mold.

A further object is to provide quickly and automatically operated means for dividing the mold into two or more compartments.

I attain these and other minor objects by mechanism illustrated by the accompanying drawings, in which;—

Figure 1:
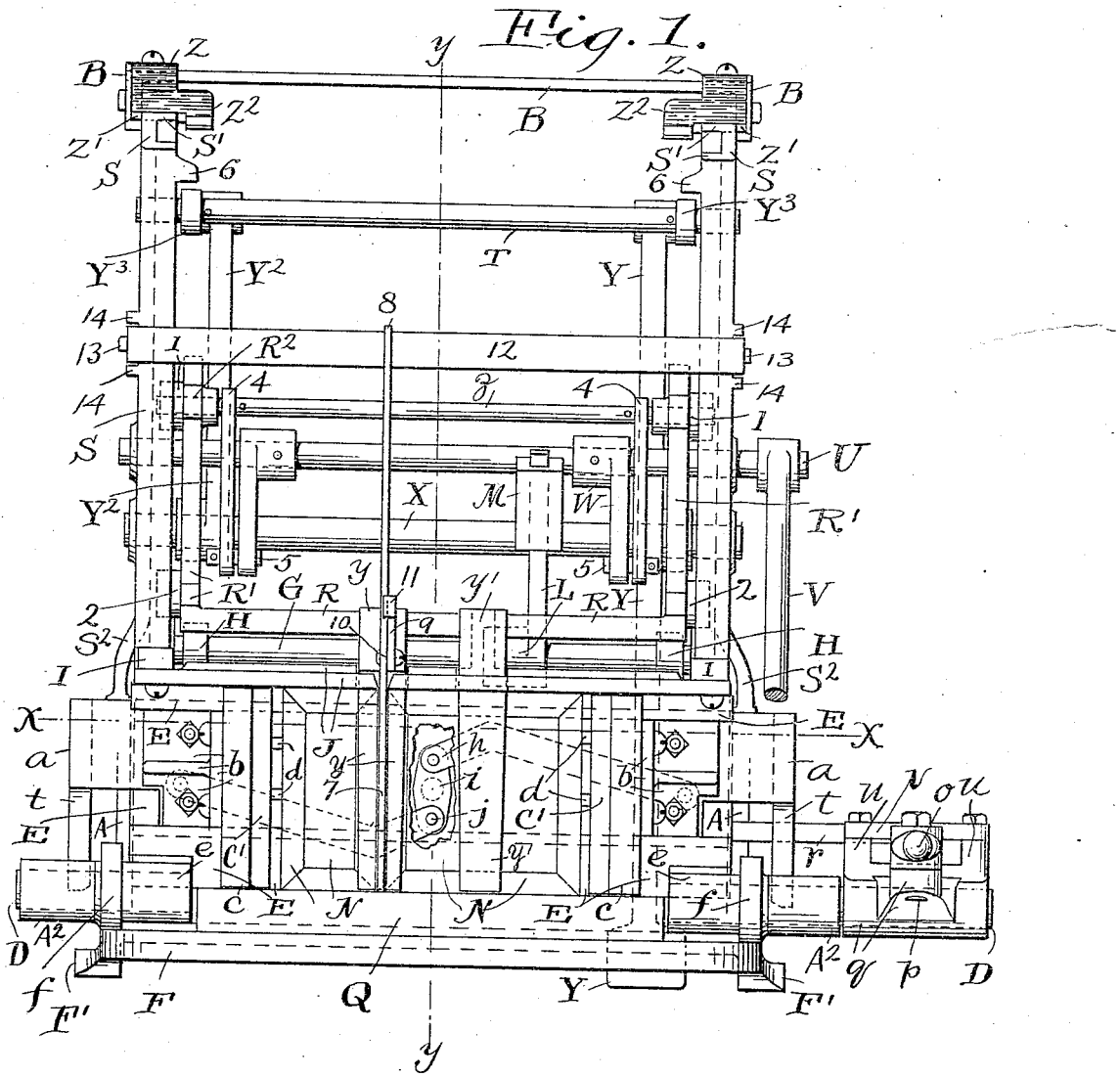
Figure 7:
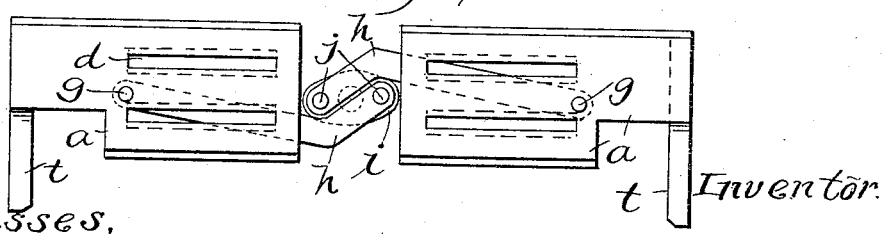
Figure 3:
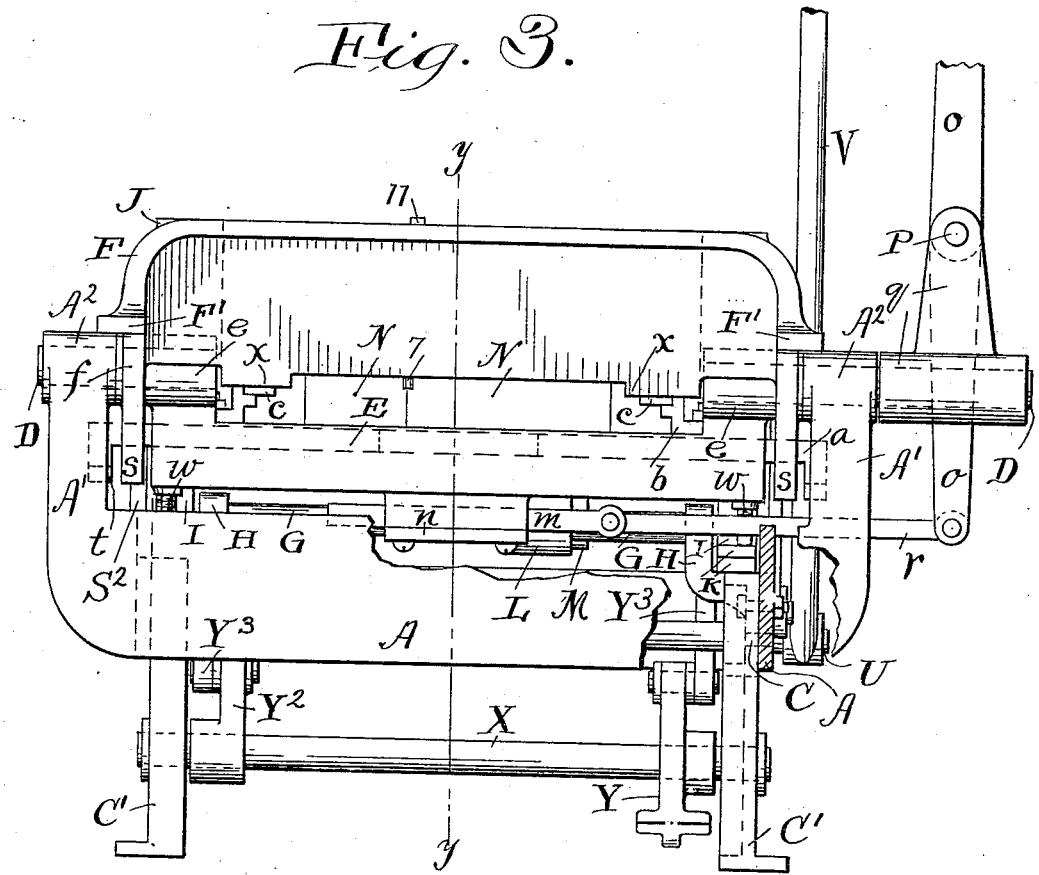
Figure 5:
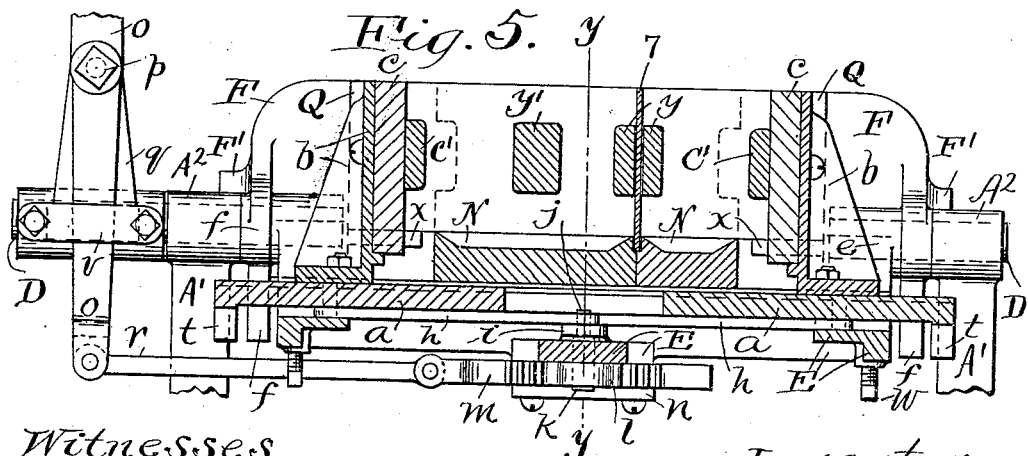
Figure 6:
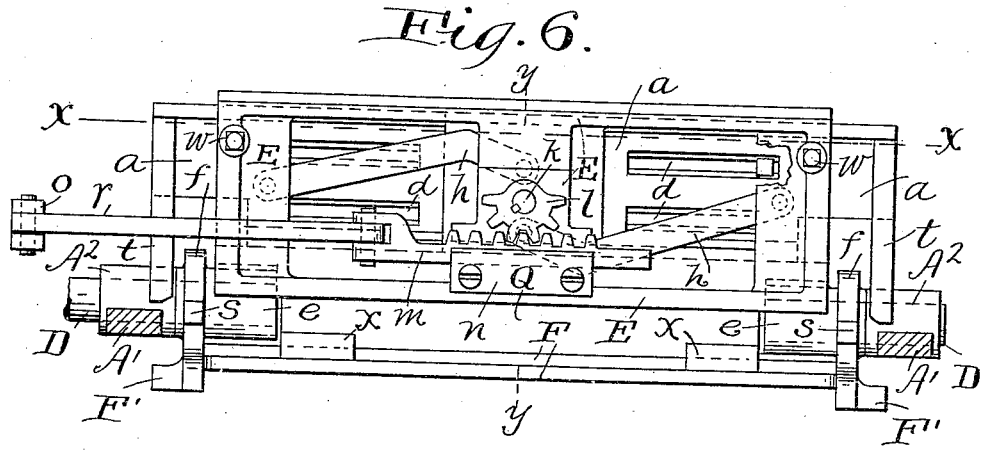
Figure 8:
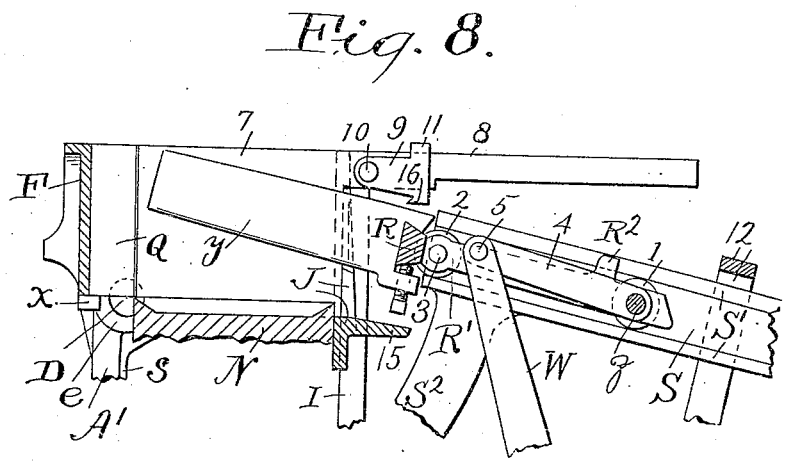
Figure 10:
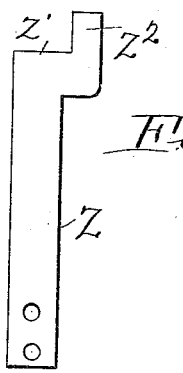

Figure 1, is a plan view of the entire machine with a portion of one face plate broken away to show the parts beneath; Fig. 2, a side elevation; Fig. 3, a front elevation, with a portion of the front frame plate broken away; Fig. 4, a sectional elevation on line, $y$, $y$, Figs. 1, 3, and others, but showing the various working parts in positions different from those shown in those figures; Fig. 5, a partial sectional elevation on line, $x$, $x$, Figs. 1, 2, and 6; Fig. 6, a reverse plan view of the mold and mold-bed parts of the machine; Fig. 7, a plan view of the slides for carrying the end plates of the mold, and of a part of the mechanism for operating them; Figs. 8 and 9, partial sectional elevations on line, $y$, $y$, Fig. 1, each showing some of the working parts in different positions from the other views, and Fig. 10, a rear elevation of one of the supports for the core-frame guide.

Like reference characters indicate like parts throughout the several views.

The front frame plate, A, rear frame plate, B, and two side frame plates, C, having leg extensions, $C^1$, constitute the main supporting frame work of the machine, and are all properly and detachably secured together. The front frame plate A, is provided with two upright extensions $A^1$, at the upper extremity of each of which is formed a trunnion bearing $A^2$.

There is a mold bed E, in form an open rectangular frame consisting of two horizontal and parallel side members connected together by two parallel end members and a central connecting bar connecting the side members at their lower edges. Projecting upwardly from each end of the front side member of the mold bed E, there is a trunnion lug $e$, in which there is rigidly secured a trunnion D. The trunnions D, are in axial alinement, extend longitudinally beyond the ends of the mold bed, and are rotatable one in each of the bearings $A^2$. The mold bed E, is thus mounted to rotate with the trunnions D, between the bearings $A^2$.

There is an outer front mold-wall plate F, having at each end thereof a laterally projecting bearing extension $f$, fitted to turn on the trunnion D, between each bearing $A^2$, and its adjacent mold bed lug, $e$. The front plate F, is also provided at each end with a stop lug $F^1$, and is free to turn from the position in which it is shown in Fig. 2, through one fourth part of a revolution, to that in which it is shown in Fig. 4, where it is stopped by the contact of its stop lugs $F^1$, with the uprights $A^1$.

The two parallel side members of the mold bed E, are grooved longitudinally on their inner surfaces near their top edges (Figs. 2 and 4), thus forming guide ways in which the parallel edges of two flat slides or end plate carriers, $a$, are fitted to slide freely. To each of the end plate carriers $a$, (Fig. 5), there is an end plate bracket $b$, detachably secured by bolts with heads lying in T slots $d$, in the end plate carriers, thus permitting the end plate brackets $b$, to be moved longitudinally of the carriers $a$, and secured thereto in any position desired. To the brackets $b$, there are mold end-plates $c$, detachably secured. Beneath each end plate carrier, $a$, and pivotally connected thereto at, $g$, there is a connector, $h$, shaped as shown in Fig. 7, and pivotally connected to the wrist plate, $i$, by the wrist pins, $j$. The wrist plate, $i$, is provided with a rigid central and cylindrical stem, *k*, which extends downwardly through and has a free bearing in the central cross connecting member of the mold bed, E.

A segmental gear, *l*, is made fast to the lower end of the wrist-plate stem, *k*, and a rack, *m*, engages with the gear, *l*, has a reciprocating movement sufficient to turn the gear and wrist plate connected therewith, through one half of a revolution and works within a guide formed by the gear, *l*, the mold bed, E, a lip projecting from the mold bed and a guide plate, *n*, detachably secured to the lip projection. The reciprocating movement is given to the rack, *m*, by an oscillatory movement of a hand lever, *o*, pivotally fulcrumed at, *p*, to a lever bracket, *q*, with its short arm operatively connected with the rack, *m*, by a connector, *r*, flexibly connected and secured to the rack and to the lever arm, *o*. Through the connectors, *h*, the slides, *a*, and the parts connected thereto are simultaneously given reciprocating movements toward and from each other by the oscillatory movements of the wrist plate, *i*. Thus by operating the lever, *o*, the end plates, *c*, are made to approach or recede from each other, to open and close the ends of the mold, and the end plates are automatically retained or locked in their closed positions against moving from any pressure from within the mold by the positions of the connectors, *h, h*, in relation to each other and to the wrist plate with which they are connected, as shown in Fig. 7, where these parts are in the position that locks the end plates of the mold.

In all the views except Fig. 7, the end plates, and all moving parts that coöperate to open and close them, are shown in position midway between the two extremes of their movements. For locking the outer front wall plate, F, when closed, there is a locking arm extension, *s*, projecting downwardly from each of the bearing extensions, *f*. The outer ends of the end plate carriers, *a*, always extend outwardly beyond the ends of the mold bed, E, and are each provided with a locking finger extension, *t*. These locking fingers are carried inwardly toward the mold in closing the end plates and lie in contact with and in the paths in which the locking arms, *s*, must move when the front plate F, opens by turning on the trunnions, D, thus locking the front plate in its closed position. Thus, operating the lever, *o*, in one direction closes and locks the end plates and front plate simultaneously, and the reverse movement of the lever, *o*, unlocks the front and end plates simultaneously and releases the end plates from the molded block. As the hand lever, *o*, is for the purpose of turning the mold bed, mold and molded block forward and over through one fourth of a revolution, as well as for opening and closing the mold, the lever bracket, *q*, is made fast to one of the trunnions, D, and is provided with two lug projections, *u*, between which the lever, *o*, moves for shifting the end plates, and to which a rub-plate, *v*, is secured for a bearing for the lever, *o*, when turning the block. A fulcrum shaft, G, extends across the machine parallel with the mold bed, E, and is supported and free to turn in bearings in the lugs, H, each of which is a part of and extends laterally and upwardly from one of the side frame plates, C. Two arms, I, are made fast to and extend laterally from the shaft, G; one near each end thereof, and to these arms is detachably secured the back wall plate of the mold, J. The machine may be supplied with several of these detachable back plates varying in height for different sizes of blocks and in the number and location of their core openings.

The arms, I, are each provided with a lateral arm extension, K, extending forwardly under the mold bed, E, and forming with the arm, I, a bell crank shaped lever with the rock shaft, G, as its pivotal fulcrum. The mold bed, E, is provided with two adjustable and removable supports, *w*, which rest, one on each of the arms, K, when the mold bed, E, is in the proper position to be filled, the arm ends, K, being in turn supported by the side frame plates, C. Thus a part of the weight of the mold bed, E, and other parts connected thereto, rests on the short arms, K, and holds the back plate, J, in its vertical or closed position, as in Figs. 2 and 9. Rigidly secured to and projecting laterally from the rock shaft, G, there is an arm, L, to which is secured a weight, M. This weight is not so heavy as to overbalance the weight of the mold bed on the arms, K. Simultaneously with the removal of the weight of the mold bed from the arms, K, in turning the mold bed forward, the weight, M, turns the shaft, G, in its bearings, thus releasing the back plate, J, from the mold block and tilting it backwardly to the position in which it is shown in Fig. 4.

As in the drawings the machine is shown arranged for making two blocks of unequal lengths by one cycle of operations, there are two face plates, N, in which the faces of the blocks are molded, detachably secured to and above the mold bed, E. A pallet, Q, on which the molded blocks are supported and borne away is placed between the front plate, F, and the ends of the plates, *c*, and is supported on edge, while the mold is being filled, by two ledges, *x*, which are formed on and project inwardly from the front plate, F. For forming hollow or perforated blocks, one or more cores are inserted into the mold and after the block has been molded they are withdrawn. In the drawings two of these cores, $y$ and, $y^1$, are shown detachably secured to a core frame comprising a central parallel bar member, R, extending horizontally across the machine back of and parallel with the back plate, J, to which central member the cores, $y$, $y^1$, are directly attached, and two parallel arm members, $R^1$, extending backwardly at right angles to the central bar, R, one from each end thereof. A round axle rod, $z$, connects, and extends through and beyond the rearward extremities of the arms, $R^1$, sufficiently to form axle bearings at its ends, on each of which a wheel, 1, is mounted to turn. A second pair of wheels, 2, are mounted to turn on axle studs, 3, which project laterally from the outer faces of arms, $R^1$, and are located, one near the junction of each of said arms with the central member, R.

The core frame, R, $R^1$, is supported and guided by a guide frame consisting of two parallel guide bars, S, connected together by a round rod, T, made fast in lugs, $T^1$, which project downwardly, one from near the rearward extremity of each guide bar, S. The guide bars, S, are above and lie in substantially the same vertical planes as the side frame plates, C, with which they are connected by downwardly and somewhat forwardly projecting arm extensions, $S^2$, pivotally connected at their lower extremities, one to each of the plates, C, at, $C^2$. The guide bars, S, each have parallel guide flanges, $S^1$, projecting laterally and inwardly from their edges and extending their entire lengths, thus making them in cross section similar to a channel bar. The wheels, 1 and 2, on each side of the core frame, R, $R^1$, lie and are free to move in the guide channels between the upper and lower guide flanges, $S^1$, by which they together with the core frame and cores are guided when the cores are projected into, or withdrawn from, the mold. For moving the core frame, R, $R^1$, toward and from the mold, a fulcrum-shaft, U, extends across the machine, turns in bearings in the side frame plates, C, and extends sufficiently beyond the frame on one side to have an operating lever arm, V, rigidly secured thereto for turning it. Two arms, W, are also rigidly secured at their lower ends to the shaft, U, and have their upper extremities flexibly connected to the axle rod, $z$, by the links, 4, through which the rod, $z$, passes, and which are pivotally connected to the arms, W, at 5.

The guide frame, S, $S^2$, being pivoted at $C^2$, may be given an oscillatory movement from the position in which it is shown in Fig. 2, to that in which it is shown in Fig. 4, and vice versa, and carries with it the core frame, R, $R^1$, the cores, $y$, and other parts not yet described. For controlling the tilting movement of the guide frame S, $S^2$, a fulcrum-shaft, X, extends across and beneath the machine and turns in bearings in the lugs, $C^3$, depending one from each side frame plate, C. A foot lever, Y, is made fast to the shaft, X, at its fulcrum, from which one arm extends forwardly within easy reach of the foot of the operator, and the other together with a like arm, $Y^2$, also rigid on the shaft, X, extends rearwardly and is connected with the rod, T, by one of the links, $Y^3$, which links are pivotally connected to the arms, Y and $Y^2$, and turn on the rod, T.

For supporting the guide frame, S, $S^2$, in the position in which it is shown in Fig. 2, there are two spring supports, Z, secured to the back frame-plate, B, in position to be sprung rearwardly by the upward movement of the guide bars, S. When the rearward extremities of the guide bars, S, rise above the shoulders, $Z^1$, of the supports, Z, the said supports spring forward bringing the shoulders, $Z^1$, under and into position to each support one of the bars, S, as shown in Fig. 2. The spring supports, Z, each have an extension, $Z^2$, offset properly to lie in the path of one of the core frame arms, $R^1$. When the core frame, R, $R^1$, is moved to the rearward extremity of its movement the rearward extremities of its arms, $R^1$, strike the extensions, $Z^2$, and spring the supports, Z, rearwardly thus disengaging the shoulders, $Z^1$, from the guide arms, S, and allowing the guide-frame, S, $S^2$, to move by gravity to the position in which it is shown in Fig. 4; where it is supported by two stops, $C^4$, secured, one to each side frame plate, C. The stops, $C^4$, may be springs as shown in the drawings. The rearward movement of the core frame, R, $R^1$, is limited by the stop lugs, 6, which project laterally, one from each of the upper guide flanges, $S^1$, and with which lugs the stop lugs, $R^2$, (projecting, one from each arm, $R^1$), come in contact. To each end plate C, there is secured a block, $C^1$, which projects into the mold for the purpose of forming a depression in and across the end of the molded block.

When two or more blocks are made in the mold by one cycle of operations these depressions are formed in the adjacent ends of the blocks by removable cores operated in the same way as the cores for forming the perforations through the blocks. As shown in the drawings the core, $y$, is for forming depressions in the adjacent ends of two blocks and core, $y^1$, for perforating blocks. The portion of the core, $y$, that can be brought within the mold is divided longitudinally into two equal parts by a vertical slot, and a division plate, 7, fits loosely in this slot and in a corresponding slot in the back plate, J. The division plate, 7, divides the mold into two compartments and extends into a guide groove between the face plates, N, and into the slot in the back plate, J. The division plate is provided with a narrow guide extension, 8, to which a catch or hook, 9, is pivoted at 10. The catch, 9, is provided with a laterally projecting stop lug, 11, which by contact with the top edge of the extension, 8, prevents its free end from falling lower than to the position in which it is shown in the drawings.

A releasing bar, 12, extends across the machine above the guide frame bars, S, by which it is at times supported, is bent at right angles and extends downwardly on each side of the machine. The ends of the releasing bar, 12, are slotted longitudinally, and guide studs, 13, which project laterally from the side frame plates, C, one in each of said slots, permit said bar to have a vertical movement guided by the studs, 13, and by the guide lugs, 14, projecting laterally from each guide frame bar, S. While the division plate, 7, is withdrawn from the mold it is supported by the releasing bar, 12, on which the extension, 8, rests, and by a supporting lug, 15, which projects laterally and rearwardly from the back plate, J, sufficiently to support the division plate when the back plate, J, is brought forward from the position in which it is shown in Fig. 4 to its upright or closed position, without changing the position of the division plate. When ready to receive the material for forming the blocks, the parts forming the mold are in the positions shown in Figs. 2, 8 and 9, with the end plates, C, moved inwardly to the extremity of their movements against the face plates, N. The division plate, 7, is then brought forward by the hand of the operator from its position in Fig. 4, to its position in Figs. 8 and 9, leaving the cores and the mechanism for controlling them in positions as in Fig. 4.

In operation the mold is first filled with material for forming the face part of the blocks up to, or somewhat above to where the under sides of the cores are to come. By the forward movement of the hand lever, V, the core frame, R, R$^1$, is then moved forwardly and somewhat upwardly, guided by the inclined guide frame bars, S, thus thrusting the cores, $y$, $y^1$, through the openings in the back plate to the position as shown in Fig. 8, the front ends of the cores so elevated as to entirely clear the material beneath them. By operating the foot lever, Y, the guide frame, S, S$^2$, is then tilted upwardly to the position as in Fig. 2, in which position it is supported as before described. The guide frame being pivoted at, C$^2$, as it rises, the forward portions of the cores, $y$, $y^1$, are tilted downwardly to their proper positions as shown in Fig. 9, thus compressing the material beneath them. While the guide frame, S, S$^2$, is in the position as shown in Fig. 2, the front ends of the guide bars, S, are in contact, one with each of the two arms, I, and thus retain the back plate, J, in its closed or upright position, while the filling and tamping of the materials in the mold between and above the cores is being completed. In shifting from its position in Fig. 8 to that in Fig. 9, the rear end of the core, $y$, raises the hook end, 16, of the catch, 9, and when the core reaches the position as in Fig. 9 the hook end, 16, of the catch drops by gravity into engagement with the rear end of the core, $y$, as shown in Fig. 9. After the mold is properly filled the cores and division plate, 7, being connected by the hook, 9, are simultaneously withdrawn horizontally from the mold by a rearward movement of the lever arm, V, and at the termination of this movement the ends of the core frame arms, R$^1$ in contact with the offset extensions, Z$^2$, force the supports, Z, from under the guide bars, S, thus permitting the guide frame and the mechanism carried by it to tilt by gravity back to the positions as in Fig. 4. The releasing bar, 12, carried by the guide frame bars, S, is arrested in its downward movement by contact, at the upper extremities of the slots in its ends with the guide studs, 13, and as the division plate, 7, is supported by its extensions, 8, resting on the guide bar, 12, it also is arrested, while the cores drop sufficiently lower to be thus automatically disengaged from the hook end, 16, of the catch, 9, as shown in Fig. 4. To remove the molded blocks from the mold, the mold bed E, is, by means of the lever arm, $o$, rotated forwardly with its trunnions through one fourth part of a revolution and carries with it the molded blocks and all the walls of the mold except the back plate, J, which plate immediately tilts backwardly to its position as in Fig. 4, when the weight of the mold bed, mold and contents is removed from the arms K. At the termination of this quarter turn movement forward, the stop lugs, F$^1$, of the front plate, F, are brought into contact with the uprights, A$^1$, and are there held by the lever, $o$, in the hands of the operator while he simultaneously unlocks the front plate, F, and releases the end plates, C, from the block by the proper horizontal movement of the same lever, $o$, turning on the fulcrum pivot at $p$. While the front plate is unlocked and the end plates released from the block, the operator turns the trunnions, mold bed, plates, C, and face plates, N, backwardly, thus releasing the face plates, N, from the blocks, 17, which are left resting on the pallet, Q, supported by the front plate, F, as shown in Fig. 4. In Fig. 4, the mold bed, E, and the parts that always move with it are shown in a position midway between the two extremes of their quarter turn movement. After returning the mold bed and parts of the mold back to the positions as in Fig. 2, and thus automatically returning the back plate, J, to its closed position also, the blocks, 17, and the pallet on which they lie are removed, another pallet is placed on the front plate which together with the pallet is brought to its upright or closed position by the hand of the operator, in which position it is again locked by closing and locking the end plates, as before described.

What I claim as my invention and desire to secure by Letters Patent is—

1. In a molding machine, the combination of a mold composed of an independently supported rear wall plate and a front part comprising a bottom plate, a front wall plate and end plates all connected and mounted to oscillate together as a unit, and a lever mounted and connected to turn said front part and to open and close said end plates, through connecting mechanism, by movements independent of its mold turning movements.

2. In a molding machine, the combination of a mold composed of an oscillatory rear wall plate independently supported and a front part comprising a bottom plate, a front wall plate and end plates all connected and mounted to turn together as a unit, and a lever mounted and connected to turn said front part and to open and close said end plates, through connecting mechanism, by movements independent of its mold turning movements; said rear wall plate operable by turning said front part.

3. In a molding machine, a mold composed of an oscillatory rear wall plate, independently supported, and a front part comprising a bottom plate, a front wall plate and end plates all connected and mounted to turn together as a unit, in combination with a lever mounted and connected to turn said front part and to open and close said end plates, through connecting mechanism, by movements independent of its mold turning movements, and independent means for moving the rear wall plate outwardly; said rear wall plate provided with means adapting it to be closed by the turning of said front part.

4. In a molding machine, a mold composed of an automatically operable rear wall plate, independently mounted for oscillation, and a front part comprising a bottom plate, an independently movable front wall plate and movable end plates all mounted and connected to oscillate together as a unit, in combination with a lever mounted and connected to oscillate said front part and by independent movements, through connecting mechanism, to open and close said end plates; the movements of said rear wall plate effected by the movements of said front part.

5. In a molding machine, a mold composed of a front part comprising a bottom plate, and an independently movable front plate and movable end plates all connected and mounted to turn together as a unit, and an oscillatory rear wall plate independently supported and adapted to be actuated by the movements of said front part, in combination with mechanism operatively connecting said end plates, and a lever mounted and connected to turn said front part and, by independent movements, through said end-plate-connecting mechanism, to open and close said end plates.

6. In a molding machine, an oscillatory mold bed and a mold composed of a front part comprising a front plate and two end plates all movably connected to and movable with said mold bed, and an oscillatory rear plate independently supported and adapted to be actuated by the movement of the mold bed, in combination with a device adapted and connected to open or close said end plates simultaneously, a lever mounted and connected to turn said mold bed and, through connecting mechanism, to actuate said device for opening and closing the end plates by movements independent of its mold bed turning movements, and independent means for actuating said rear plate in one direction.

7. In a molding machine, a mold bed mounted to turn on trunnions, and a mold composed of a front part comprising a front plate and end plates all mounted and connected to move with, and to also move independently of said mold bed, and an oscillatory rear plate independently supported and adapted to be actuated by the movements of the mold bed, in combination with a wrist plate connected to, and operable to open and close said end plates, a lever bracket rigidly secured to one of said trunnions, and a lever pivoted to said lever bracket and connected for operating said wrist plate.

8. In a molding machine, a mold bed mounted to turn on trunnions, and a mold composed of a front part comprising a front plate and end plates all mounted and connected to move with and to also move independently of said mold bed, and a rear wall plate independently supported, in combination with a wrist plate connected to, and operable to open and close said end plates, a lever bracket rigidly secured to one of said trunnions, and a lever pivoted to said lever bracket and connected for operating said wrist plate.

9. In a molding machine, a mold composed of a front part comprising a bottom plate, end plates and a front plate all connected and mounted to turn together as a unit, on trunnions, and an independently supported rear plate, in combination with a wrist plate connected to, and operable to open and close said end plates, a lever bracket rigidly secured to one of said trunnions and a lever pivoted to said lever bracket and connected for operating said wrist plate.

10. In a molding machine, an oscillatory mold-bed, a mold composed of a front part comprising a front plate having locked arm extensions and mounted for independent oscillation and an independently operable pair of end plates all connected to turn together with the mold bed, and an independently supported rear plate, in combination with a wrist plate connected with, and operable to open and close said end plates, locking members connected to be moved to and from locking engagement with said locking arm extensions by the movements of said wrist plate, and means for actuating the wrist plate.

11. In a molding machine, a mold composed of front and rear parts, the front part comprising a bottom plate, an independently movable front plate, having locking arm extensions, and an independently movable pair of end plates all connected and mounted to oscillate together as a unit, and the rear part comprising a rear plate independently mounted for oscillation, in combination with locking members adapted and connected to be moved to and from locking engagement with said locking arm extensions by the closing and opening of said end plates.

12. In a molding machine, a mold composed of a front part comprising a bottom plate, an independently movable front plate and an independently movable pair of end plates all mounted and connected to oscillate together as a unit, and a rear wall plate independently mounted for oscillation and operable by the movement of said front part, in combination with mechanism connected and adapted for operating the end plates simultaneously and in opposite directions and means for actuating said end-plate-operating mechanism.

13. In a molding machine, a mold composed of a front part comprising a bottom plate, an independently movable front plate and an independently movable pair of end plates all mounted and connected to oscillate together as a unit, and a rear wall plate independently mounted for oscillation and operable by the movements of said front part, in combination with a wrist plate connected to, and operable to open and close said end plates, and means for actuating said wrist plate.

14. In a molding machine, a mold bed mounted for oscillation, and a mold composed of front and rear parts, the front part comprising a front plate having locking arm extensions, and end plates all movably connected to and movable with said mold bed, and the rear part comprising a rear plate independently mounted for oscillation and adapted and connected to be operated by the oscillatory movement of said front part, in combination with locking members adapted and connected to be moved to and from locking engagement with said locking arm extensions by the movement of said end plates.

15. In a molding machine, a mold comprising a rear wall plate independently mounted for oscillation, an independently oscillatory front plate, a bottom plate and movable end plates, in combination with means for locking said front plate against independent movement and means connected and adapted for simultaneously opening or closing said end plates, said bottom and front plates connected and mounted to turn together toward and away from said rear plate, and said rear plate operable by the turning movement of said front and bottom plates.

16. In a molding machine, a mold comprising a rear plate independently mounted for oscillation, an independently oscillatory front plate, a bottom plate and movable end plates, in combination with a wrist plate connected with, and operable to open and close said end plates, means for locking said front plate against independent movement and means for actuating said wrist plate; said bottom and front plates connected and mounted to turn together toward and away from said rear plate, and the rear plate operable by the turning movement of said front and bottom plates.

17. In a molding machine, a mold, in combination with a movable core, means for guiding and moving the core into and out of the mold and means for depressing said core laterally within the mold, independently of its other movements.

18. In a molding machine, a mold, in combination with a movable core, means for guiding and moving the core into and out of the mold, means for depressing the core laterally within the mold, independently of its other movements, and means for retaining said core in its depressed position.

19. In a molding machine, a mold comprising a bottom plate and an independently movable front plate mounted and connected to turn together, and other movable plates, in combination with a movable core, means for moving and guiding the core into and out of the mold, means for depressing the core laterally within the mold, independently of its other movements, and means for retaining said core in its depressed position.

20. In a molding machine, a mold comprising a bottom plate and an independently movable front plate mounted and connected to turn together, and an independently supported rear plate, in combination with a movable core, means for moving the core into and out of the mold, means for depressing the core laterally within the mold, independently of its other movements, and means for retaining said core in its depressed position.

21. In a molding machine, a mold comprising a bottom plate and an independently movable front plate mounted and connected to turn together, and a rear plate independently mounted for oscillation and operable by the movements of the other parts of the mold, in combination with a movable core, means for moving and guiding the core into and out of the mold, means for depressing said core laterally within the mold, independently of its other movements, and means for retaining said core in its depressed position.

22. In a molding machine, a mold and a movable core, in combination with movable means for supporting and guiding the core, means for moving the core into and out of the mold and means for shifting said core-guiding means and thus depressing the core laterally within the mold.

23. In a molding machine, a mold, in combination with a core frame, a core secured to said core frame, an oscillatory guide frame adapted for supporting and guiding said core frame, means for actuating the core frame to move the core into and out of the mold, means for tilting the guide frame to depress the core laterally within the mold and means for retaining said guide frame in position until the core is withdrawn from the mold.

24. In a molding machine, a mold, in combination with a core frame, a core secured to said core frame, an oscillatory guide frame adapted for supporting and guiding said core frame, means for actuating the core frame to move the core into and out of the mold, means for tilting the guide frame to depress the core laterally within the mold and means for supporting said guide frame while the core is in the mold; said supporting means adapted to be automatically disengaged from the guide frame by the movement of the core frame.

25. In a molding machine, a mold composed of a front part comprising a bottom and a front plate mounted and connected to oscillate together, and movable end plates, and a rear plate independently mounted for oscillation, in combination with a core frame, a core secured to said core frame, an oscillatory guide frame adapted for supporting and guiding said core frame, means for actuating the core frame to move the core into and out of the mold, means for tilting said guide frame to depress the core laterally within the mold, and means for supporting the guide frame in position until the core is withdrawn from the mold; said guide frame adapted to retain said rear plate in its closed position until the core is withdrawn from the mold.

26. In a molding machine, a mold, a movable core, and means comprising a lever, connected and adapted to move the core into and out of the mold, in combination with a division plate adapted for independent movement into the mold, and means for connecting said division plate for withdrawal from the mold by the operation of said means for moving the core.

27. In a molding machine, a mold, a movable core comprising two parts separated by a space, and means comprising a lever connected and adapted to move the core into and out of the mold, in combination with a division plate movable in the space between said two core parts and adapted for independent movement into the mold, and means for connecting said division plate for withdrawal from the mold by the operation of said core-moving means.

28. In a molding machine, a mold, a movable core and means comprising a lever, connected and adapted to move the core into and out of the mold, in combination with a division plate adapted for independent movement into the mold, means for connecting said division plate for withdrawal from the mold by the operation of said core moving means, and means for releasing said division plate during the withdrawal movement of the core.

29. In a molding machine, a mold, a movable core and means for moving and guiding the core into and out of the mold, in combination with a division plate supported and adapted for independent movement into the mold, and a hook pivoted to the division plate and adapted to engage with the core and thus connect said plate for withdrawal from the mold, together with the core.

30. In a molding machine, a mold, a movable core and means for moving and guiding the core into and out of the mold, in combination with a division plate supported and adapted for independent movement into the mold, a hook pivoted to the division plate and adapted to engage with the core and thus connect said plate for withdrawal from the mold together with said core, and means adapted to automatically release the hook from the core during the withdrawal movement of said core.

31. In a molding machine, a mold, two or more movable cores and means comprising a lever for moving said cores into and out of the mold, one of said cores comprising two parts separated by a space, in combination with a division plate movable in the space between said two core parts and adapted for independent movement into the mold and means for connecting said division plate for withdrawal from the mold, by the operation of said core moving means.

32. In a molding machine, a mold composed of front and rear parts, the front part comprising a bottom plate and independently movable front and end plates all connected and mounted to oscillate together as a unit, and the rear part comprising a rear plate independently mounted for oscillation, and adapted and connected to be operated by the oscillatory movement of said front part.

33. In a molding machine, a mold composed of front and rear parts, the front part comprising a bottom plate, an independently movable front plate, having locking arm extensions, and an independently movable pair of end plates all connected and mounted to oscillate together as a unit, and the rear part comprising a rear plate mounted for oscillation and adapted and connected to be moved to its closed position by the oscillatory movement of said front part, in combination with means for actuating said rear part when released by the oscillatory movement of said front part.

Signed at Kent, Ohio, this 9th day of Oct., 1907.

ALVAH L. POST.

Witnesses:
J. C. WOODARD,
EMMA N. COBURN.